US011713611B2

(12) United States Patent
Marshall et al.

(10) Patent No.: US 11,713,611 B2
(45) Date of Patent: Aug. 1, 2023

(54) POWER VENTING DRIVE MECHANISM FOR VEHICLE

(71) Applicant: TriMark Corporation, New Hampton, IA (US)

(72) Inventors: Glen A. Marshall, Waverly, IA (US); Matthew L. Hidding, Elma, IA (US); Christopher M. Lane, New Hampton, IA (US); Daniel J. Labonte, Colorado Springs, CO (US); Nicholas L. Kloxin, New Hampton, IA (US); Coyle J. Hruska, Lime Springs, IA (US)

(73) Assignee: TriMark Corporation, New Hampton, IA (US)

( * ) Notice: Subject to any disclaimer, the term of this patent is extended or adjusted under 35 U.S.C. 154(b) by 133 days.

(21) Appl. No.: 17/249,569

(22) Filed: Mar. 5, 2021

(65) Prior Publication Data

US 2021/0277703 A1    Sep. 9, 2021

Related U.S. Application Data

(60) Provisional application No. 62/987,118, filed on Mar. 9, 2020.

(51) Int. Cl.
*E05F 15/00*    (2015.01)
*E05F 15/73*    (2015.01)
(Continued)

(52) U.S. Cl.
CPC .............. *E05F 15/73* (2015.01); *B60J 1/007* (2013.01); *E05F 15/40* (2015.01); *E05F 15/63* (2015.01);
(Continued)

(58) Field of Classification Search
CPC .......... E05F 15/40; E05F 15/63; E05F 15/73; E05Y 2201/434; E05Y 2400/32;
(Continued)

(56) References Cited

U.S. PATENT DOCUMENTS 4,571,884 A    2/1986 Hetmann et al.
4,861,089 A    8/1989 Compeau et al.
(Continued)

FOREIGN PATENT DOCUMENTS

CN    110656842 A    1/2020
DE    102011014774 A1    8/2012
(Continued)

*Primary Examiner* — Chi Q Nguyen
(74) *Attorney, Agent, or Firm* — McKee, Voorhees & Sease, PLC

(57) ABSTRACT

A window vent system and method automatically vents air pressure from a vehicle cabin as the vehicle door is closing. A drive mechanism is mounted to a vehicle window. A sensor senses open and closed positions of the door latch. When the latch is open, a signal is sent from the sensor to a controller to open the window. When the latch is closed, a signal is sent to the controller to close the window. Software prevents closing of the window in the event of a pinch event. The software also stops the drive mechanism if there is an obstruction to opening or closing of the window. Manual override is also provided to selectively open and close the window.

17 Claims, 16 Drawing Sheets

(51) Int. Cl.
  *E05F 15/40* (2015.01)
  *E05F 15/63* (2015.01)
  *B60J 1/00* (2006.01)
(52) U.S. Cl.
  CPC ... *E05Y 2201/434* (2013.01); *E05Y 2201/624* (2013.01); *E05Y 2400/32* (2013.01); *E05Y 2400/40* (2013.01); *E05Y 2400/44* (2013.01); *E05Y 2400/54* (2013.01); *E05Y 2900/518* (2013.01); *E05Y 2900/55* (2013.01)
(58) Field of Classification Search
  CPC .......... E05Y 2201/624; E05Y 2400/40; E05Y 2400/44; E05Y 2400/54; E05Y 2900/518; E05Y 2900/55; B60J 1/007
  See application file for complete search history.

(56) References Cited

U.S. PATENT DOCUMENTS

| | | | |
|---|---|---|---|
| 4,918,865 A | 4/1990 | Hirai | |
| 5,140,771 A | 8/1992 | Moy et al. | |
| 5,161,419 A | 11/1992 | Moy et al. | |
| 5,194,038 A | 3/1993 | Klomhaus et al. | |
| 5,203,113 A | 4/1993 | Yagi | |
| 5,385,061 A | 1/1995 | Moy et al. | |
| 5,438,801 A | 8/1995 | Ishihara et al. | |
| 5,680,728 A | 10/1997 | Moy | |
| 5,695,397 A | 12/1997 | Frank et al. | |
| 5,904,618 A | 5/1999 | Lewis | |
| 5,966,871 A | 10/1999 | Tsuda et al. | |
| 6,056,348 A | 5/2000 | Tsuda et al. | |
| 6,073,995 A | 6/2000 | Klein | |
| 6,195,940 B1 | 3/2001 | Moy | |
| 6,273,127 B1 | 8/2001 | Wade | |
| 6,561,055 B1 | 5/2003 | Turk | |
| 6,834,463 B2 | 12/2004 | Fukumoto et al. | |
| 8,671,619 B2 | 3/2014 | Stenzel et al. | |
| 8,677,689 B1* | 3/2014 | Draper | E05F 15/63 49/281 |
| 8,708,396 B2 | 4/2014 | Konchan | |
| 9,410,629 B2 | 8/2016 | Carlson et al. | |
| 9,656,534 B2 | 5/2017 | Wade et al. | |
| 9,855,981 B1 | 1/2018 | Dunford et al. | |
| 10,352,084 B2 | 7/2019 | Hovel et al. | |
| 10,543,736 B2 | 1/2020 | Freeman et al. | |
| 2001/0022049 A1* | 9/2001 | Clark | B60J 5/06 49/31 |
| 2002/0148164 A1 | 10/2002 | Bandemer et al. | |
| 2005/0193632 A1* | 9/2005 | Orban | E05F 15/73 49/340 |
| 2006/0090400 A1* | 5/2006 | Los | E05F 15/78 49/28 |
| 2010/0325960 A1 | 12/2010 | McEwan | |
| 2014/0259928 A1 | 9/2014 | Morris | |
| 2016/0121699 A1* | 5/2016 | Snider | E05F 15/60 49/13 |
| 2019/0024419 A1* | 1/2019 | Rrumbullaku | E05B 81/20 |
| 2019/0309559 A1* | 10/2019 | Hall | E05F 15/635 |
| 2020/0141171 A1 | 5/2020 | Ghannam | B60Q 1/50 |
| 2021/0090427 A1* | 3/2021 | Hass | G08B 25/018 |
| 2022/0049537 A1* | 2/2022 | Yang | E05F 17/00 |
| 2022/0268074 A1* | 8/2022 | Leonard | E05F 15/622 |
| 2022/0268078 A1* | 8/2022 | Snider | E05F 15/643 |
| 2022/0268082 A1* | 8/2022 | Fujita | E05F 15/72 |

FOREIGN PATENT DOCUMENTS

| | | |
|---|---|---|
| DE | 102016118536 A1 | 3/2018 |
| EP | 2815907 A2 | 12/2014 |
| FR | 3087738 A1 | 5/2020 |
| GB | 2453340 A | 4/2009 |

\* cited by examiner

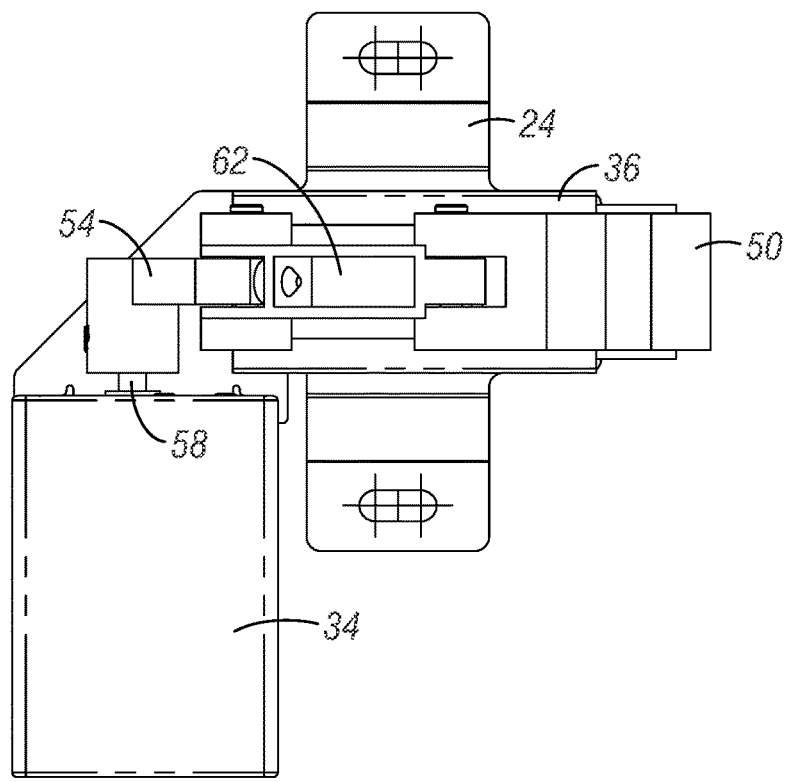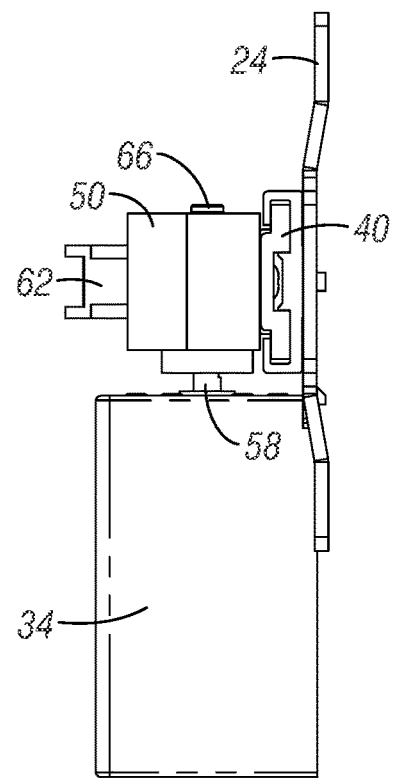
FIG. 10  FIG. 11
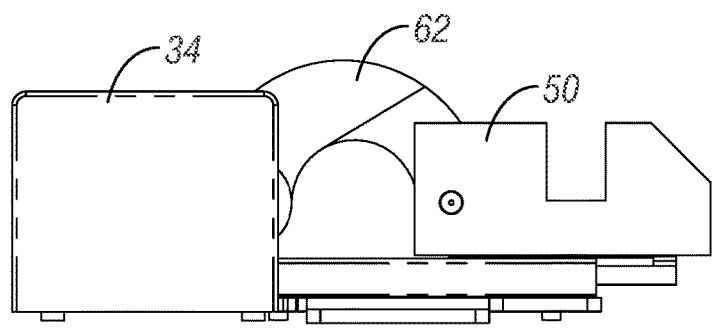
FIG. 12

POWER VENTING DRIVE MECHANISM FOR VEHICLE

CROSS-REFERENCE TO RELATED APPLICATIONS

This application claims priority to Provisional Application U.S. Ser. No. 62/987,118, filed on Mar. 9, 2020, which is herein incorporated by reference in its entirety.

FIELD OF THE INVENTION

The invention relates to an automatic venting system and method for a vehicle compartment to relieve air pressure in the compartment when the compartment door is closing.

BACKGROUND OF THE INVENTIONS

Many vehicles, such as those used in agricultural, construction, earth moving, and the like, utilize large entrance doors on the cabs for easy ingress and egress by the vehicle operator. The cabs are also well sealed to prevent migration of dust and other foreign material into the cab, both during operation of the vehicle and while the vehicle is inoperative. This combination of large doors and a well-sealed cab creates air pressure problems within the cab when the door is being closed due to the volume of air being trapped or compressed inside the cab while the door is closing. Pressure venting systems have been utilized in the prior art to reduce the closing force of the door. Such prior art air pressure venting systems are found in the door, the fender, or the trunk of the vehicle and typically are one-way air valves but are generally insufficient because they are suited for air conditioning and are not sized to the door area/volume ratio of the enclosure of the cab to completely alleviate door closing pressures. Such prior art systems are difficult for retrofit applications, absent significant modifications to the vehicle. These prior art pressure venting systems are limited in the amount of air volume that can be vented resulting in only a minor reduction in the pressure problems while closing the cab door and are supplemental to one-way air valves.

Therefore, there is a need for an improved, and effective vehicle air venting system for use during closing of the vehicle door.

A primary objective of the present invention is the provision of a power venting system is to relieve air pressure in the vehicle cab when the vehicle door is closing.

Another objective of the present invention is the provision of a venting system and method for a vehicle which automatically opens and closes the window in response to open and closed conditions of the vehicle door latch.

A further objective of the present invention is the provision of a power venting system for a vehicle cab which allows a window to be automatically and manually opened and closed.

A further objective of the present invention is a fully automatic power venting window system to replace one-way air valves.

Still another objective of the present invention is the provision of a method for automatically venting internal air pressure in a vehicle cab or compartment as the vehicle door is closing.

Yet another objective of the present invention is the provision of a method of venting air pressure in a vehicle cab by sensing the open and closed positions of a vehicle door latch and sending a signal to a motor to close and open a vehicle window to vent air from the vehicle when the door is closing.

These and/or other objectives, features, and advantages of the disclosure will be apparent to those skilled in the art. The present invention is not to be limited to or by these objects, features and advantages. No single embodiment need provide each and every object, feature, or advantage.

SUMMARY OF THE INVENTION

A power venting system is provided for the cab of a vehicle for automatic and manual operation of opening and closing of a window. In an automatic mode, a sensor detects the open and closed positions of the vehicle door latch and sends a signal via a drive mechanism controller to an electric motor. The motor is mounted to the window frame. A drive mechanism is operatively connected to the motor and to the window, such that rotation of the motor in one direction opens the window and rotation of the motor in opposite direction closes the window. The window latch can be disconnected from the drive mechanism for manual opening and closing of a window. The drive mechanism controller contains software that can detect when the closing of the window is pinching an obstruction and stops the signal to the motor, and can detect while opening the window contact with an obstruction and stops the signal to the motor.

A method is provided for automatically venting air pressure from a vehicle compartment upon closing the vehicle door. The method senses open and closed positions of the door latch and sends a corresponding signal to a motor to actuate a drive mechanism connected to the window so as to open the window when the door is closing.

BRIEF DESCRIPTION OF THE DRAWINGS

FIG. 10 is a top plan view of the drive mechanism shown in FIG. 9.

FIG. 11 is an end elevation view of the drive mechanism shown in FIG. 9.

FIG. 12 is a side elevation view of the drive mechanism shown in FIG. 9.

DETAILED DESCRIPTION OF THE INVENTION

Figure 1:
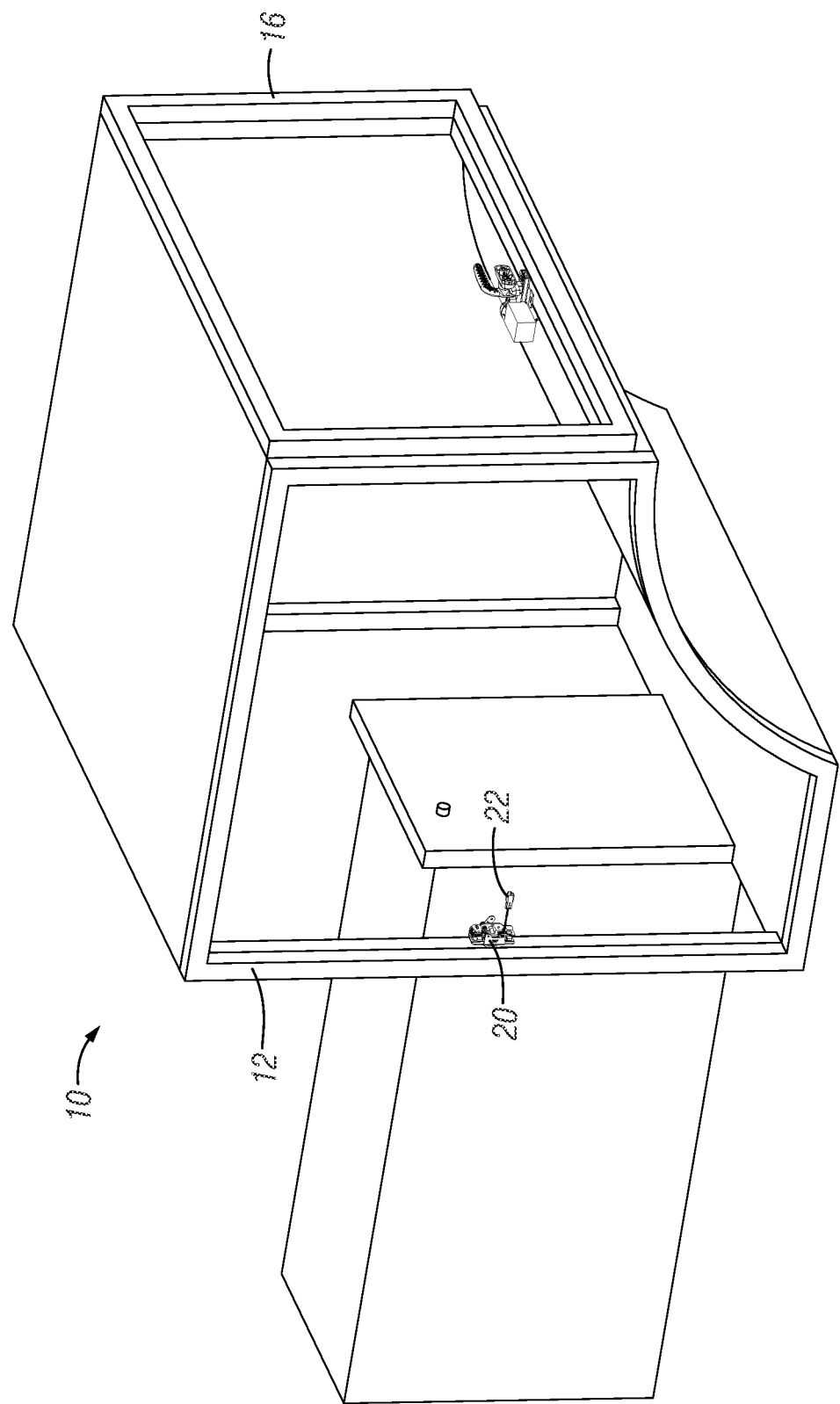
FIG. 1 is a perspective view of a cab with the door and window closed.
Figure 2:
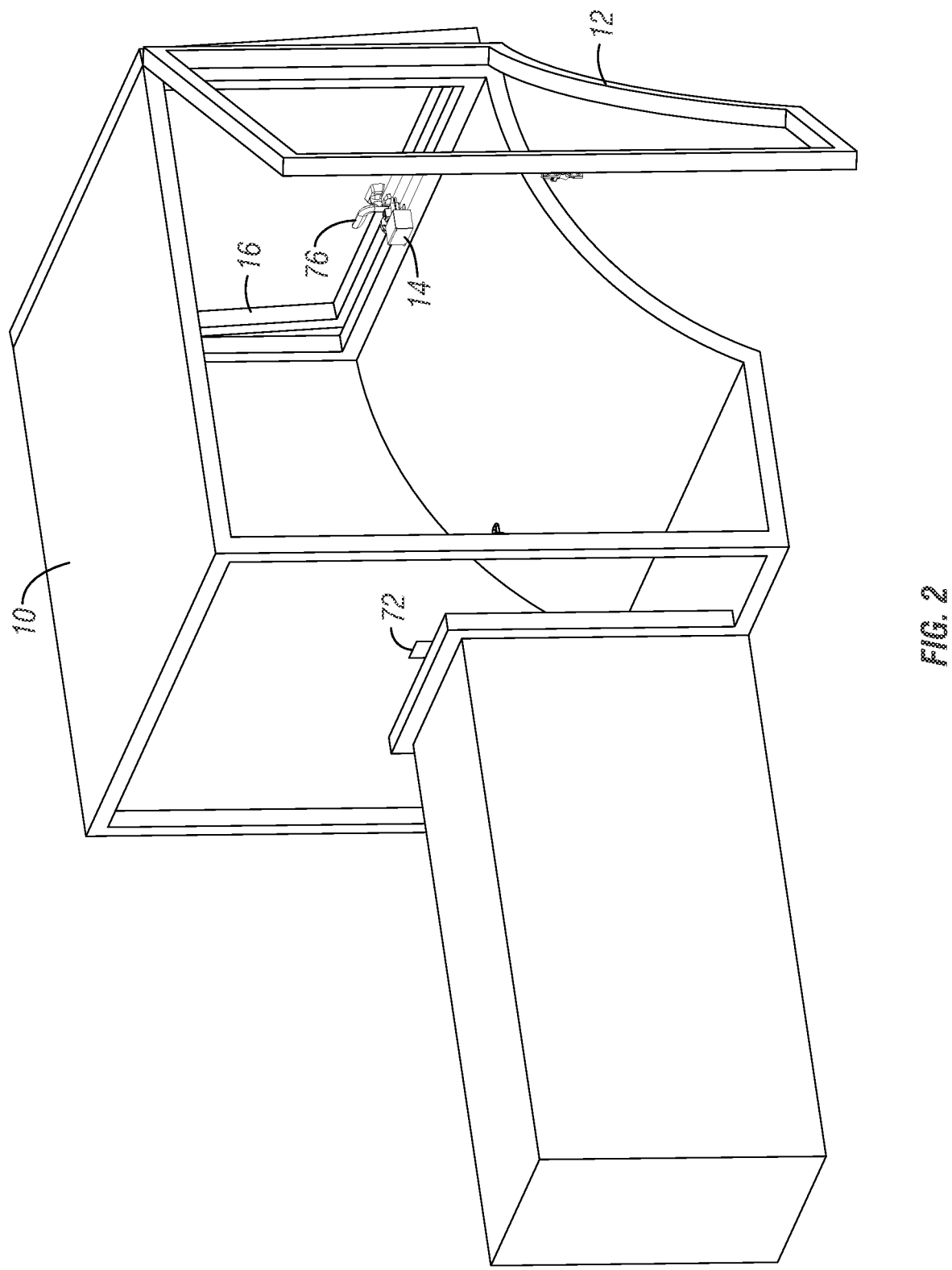
FIG. 2 is a perspective view of a cab with the entrance door open, the power venting window system drive mechanism extended and engaged with the window handle.
Figure 3:
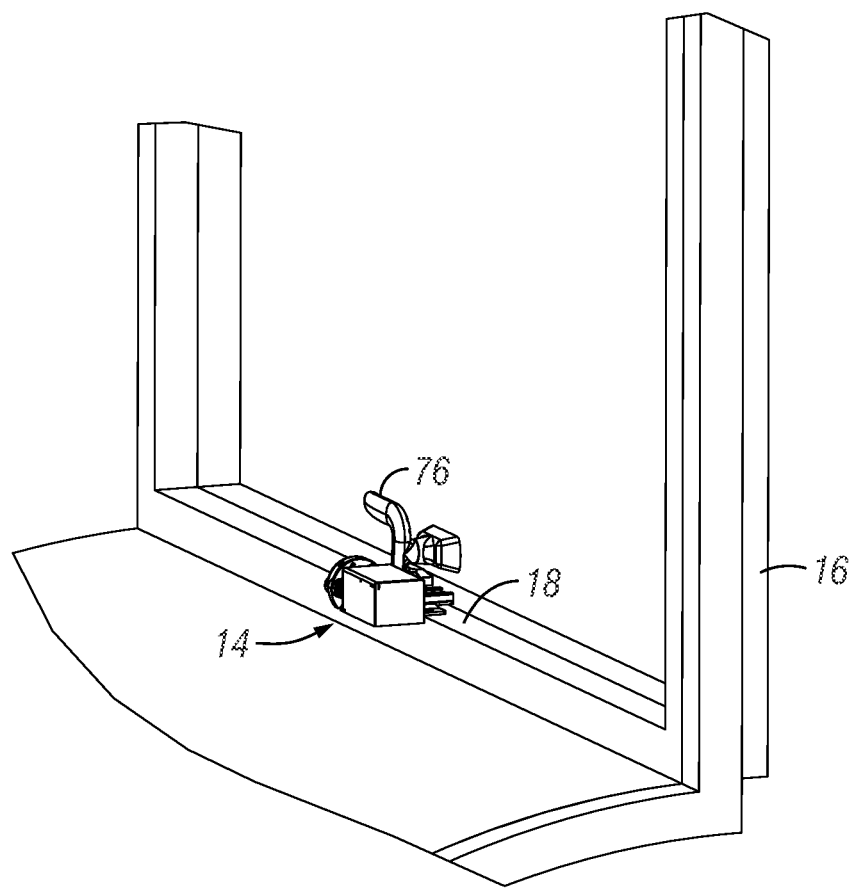
FIG. 3 is a perspective view of the drive mechanism retracted and engaged with the window handle.
Figure 4:
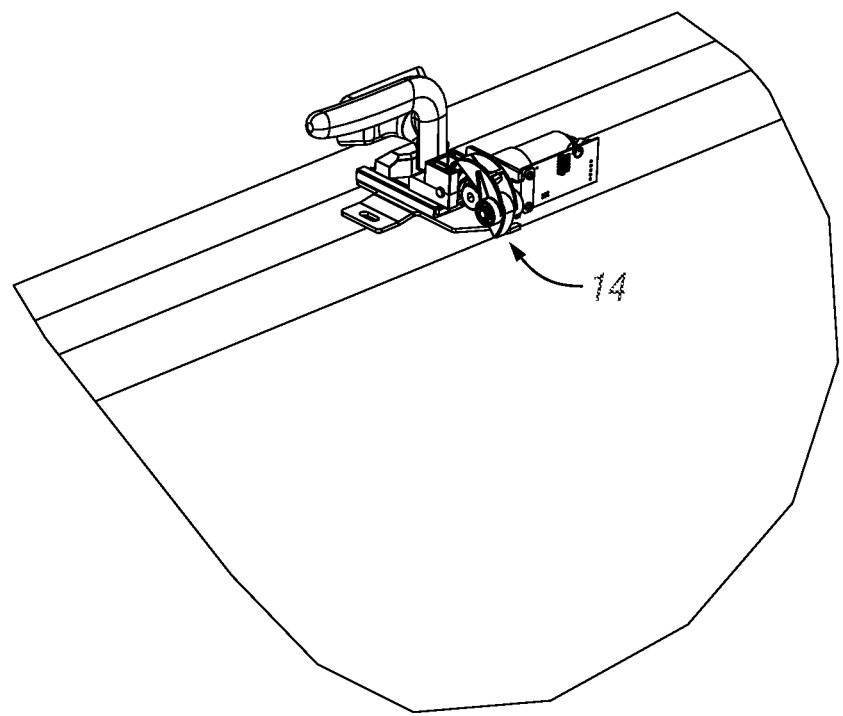
FIG. 4 is a perspective view of the drive mechanism with cover hidden, fully retracted, and engaged with the window handle.
Figure 5:
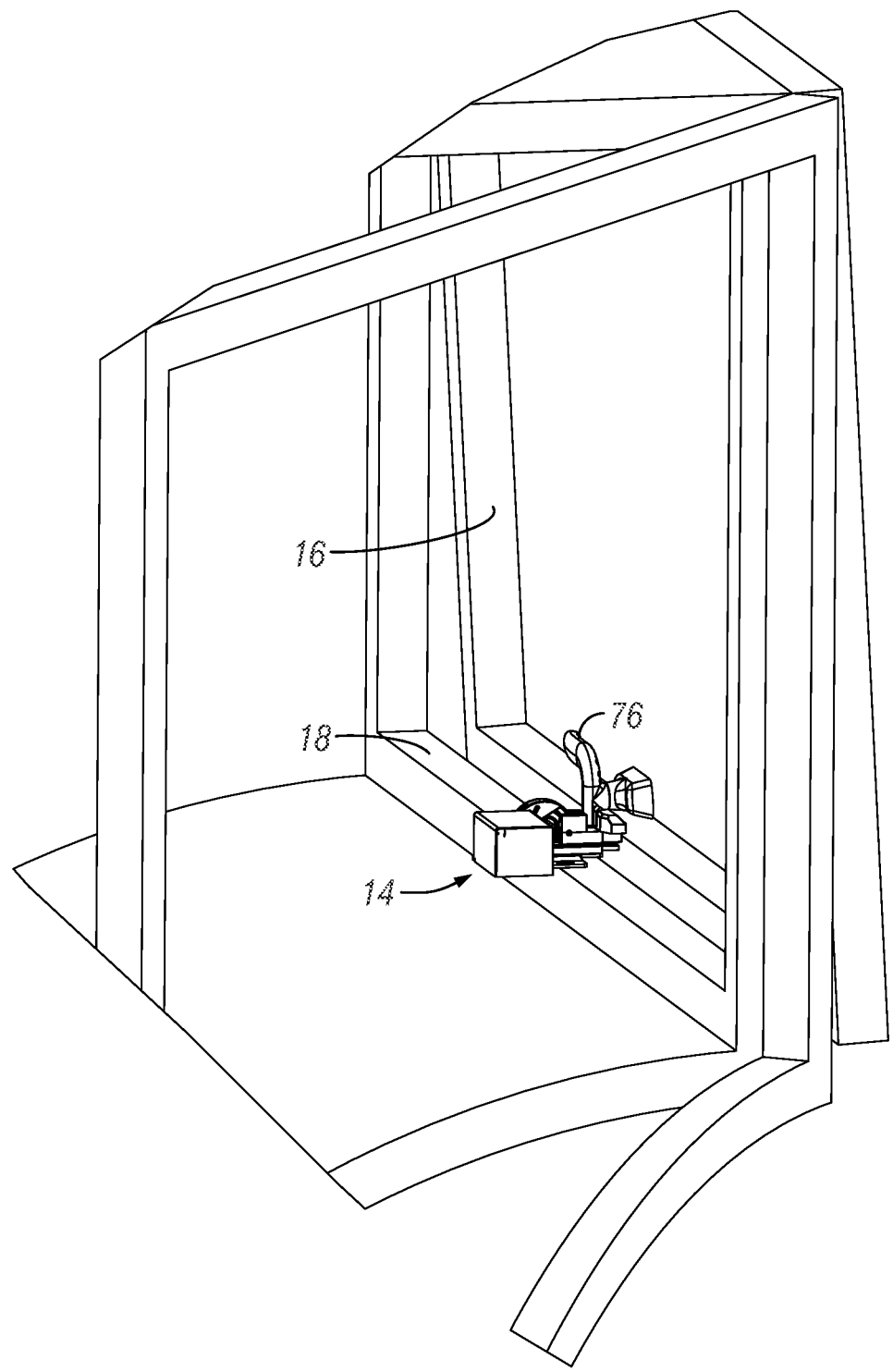
FIG. 5 is a perspective view of the drive mechanism extended and engaged with the window handle.
Figure 6:
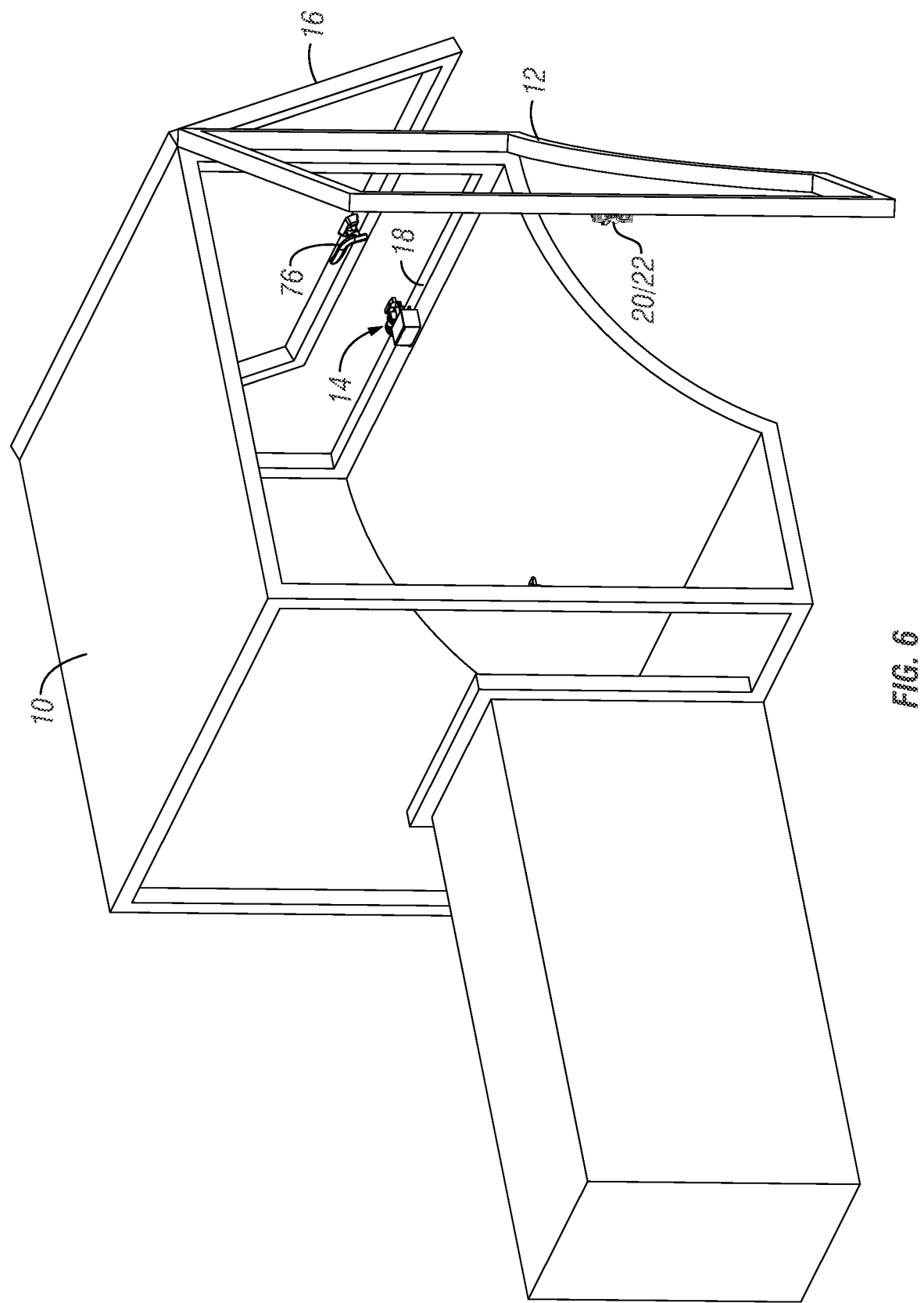
FIG. 6 is a perspective view of a cab with the entrance door open, the drive mechanism extended, and the window handle disengaged from the strike.
Figure 7:
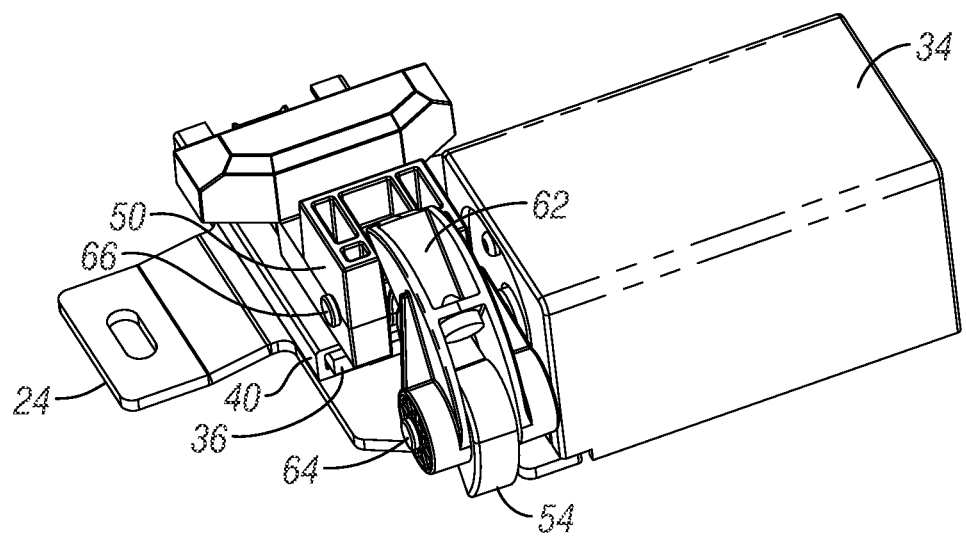
FIG. 7 is a perspective view of the drive mechanism in the retracted position, showing the cam in contact with the link bumper.

The power venting window system of the present invention provides for automatic venting of air pressure within a vehicle cab 10 when the vehicle door 12 is being closed. The power venting window system includes a drive mechanism 14 mounted to the vent window 16 and to the window frame 18 and wired to the door latch 20 which retains the vehicle door 12 in a closed position. The door latch 20 includes a latch sensor 22 which detects the open and closed conditions of the door latch 20 and sends a signal to the drive mechanism 14 to automatically open and close the vent window 16 in correspondence with the door latch 20 open and closed positions, respectively.

The drive mechanism 14 includes a mounting plate 24 which is secured to the window frame 18 with screws or other conventional fasteners. A reversible DC motor 26 is mounted to the mounting plate 24 with screws 28. A printed circuit board (PCB) 30 is also mounted to the mounting plate 24 using screws 32 or other fasteners. A housing 34 also mounts to the mounting plate 24 so as to enclose the DC motor 26 and the PCB 30.

Figure 8:
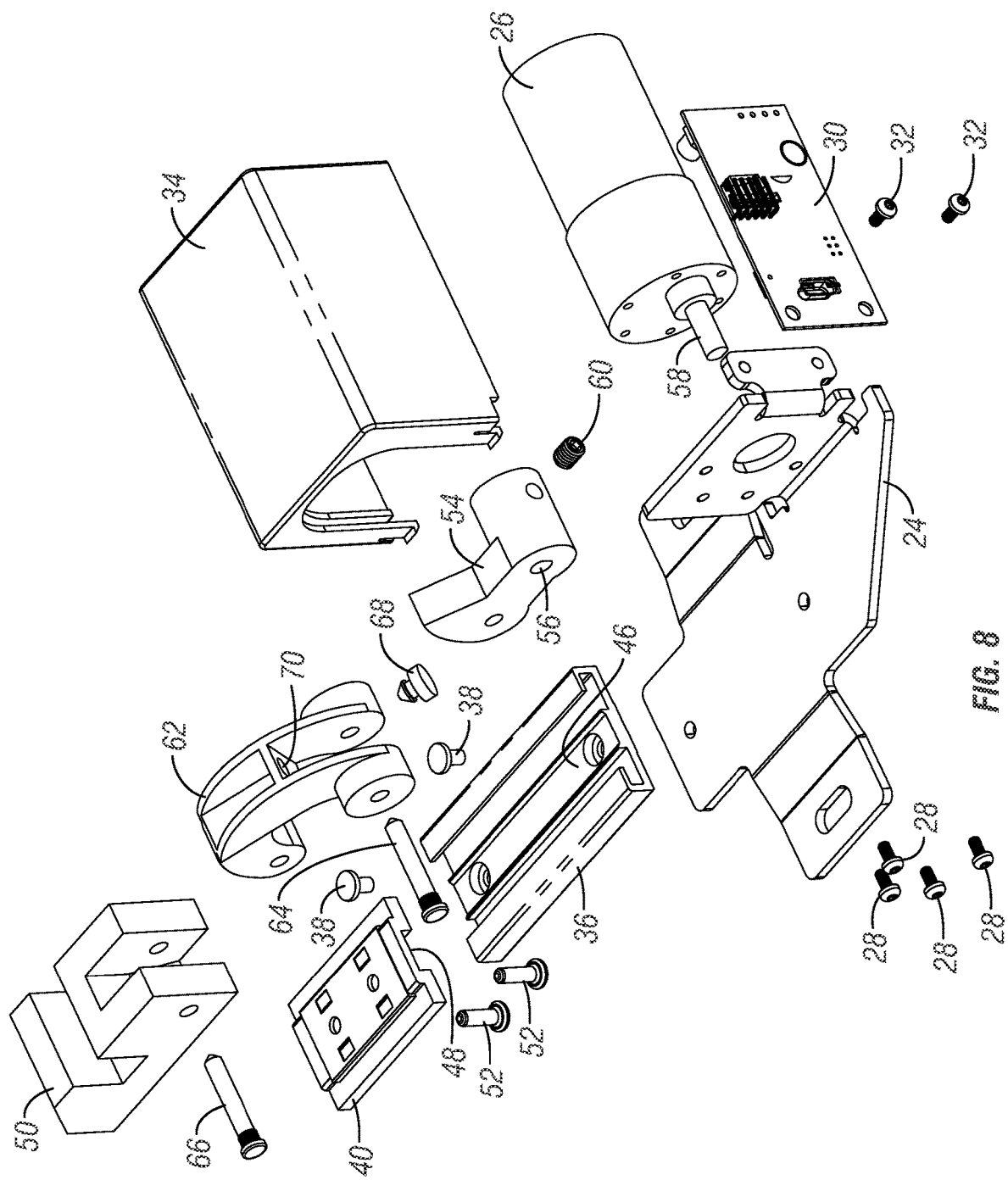
FIG. 8 is an exploded view of the overall drive mechanism.
Figure 9:
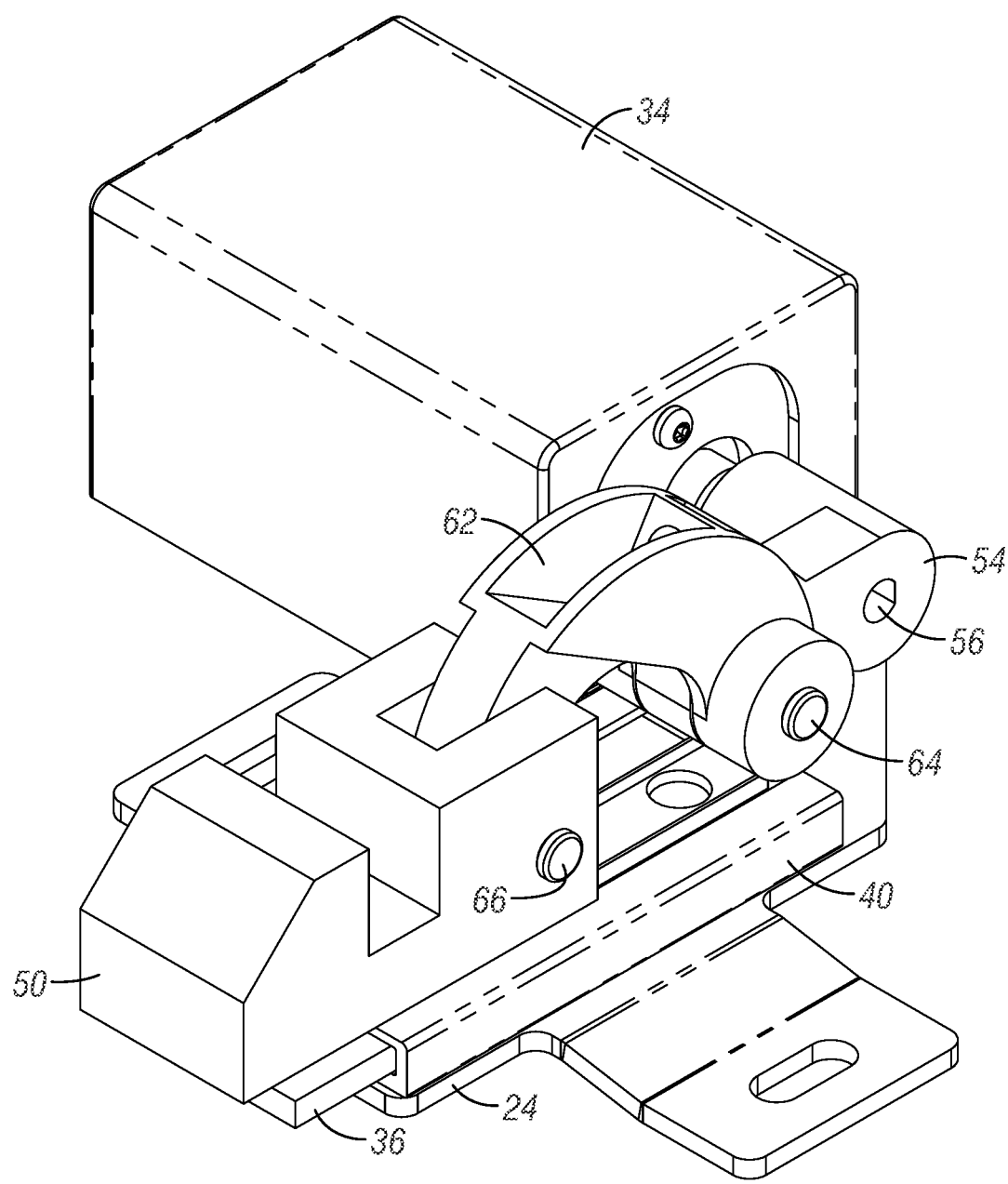
FIG. 9 is another perspective view of the drive mechanism in an extended position.
Figure 13:
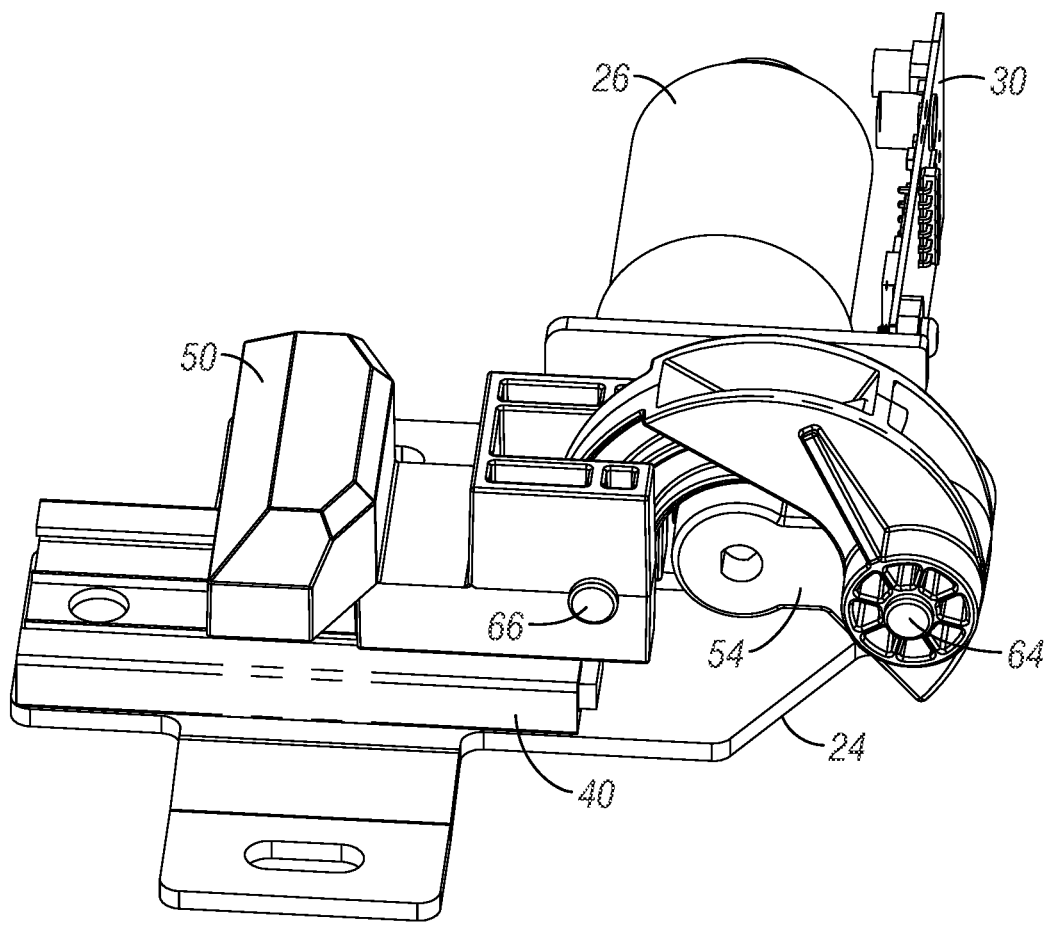
FIG. 13 is a perspective view of the drive mechanism with cover hidden and fully retracted.
Figure 14:
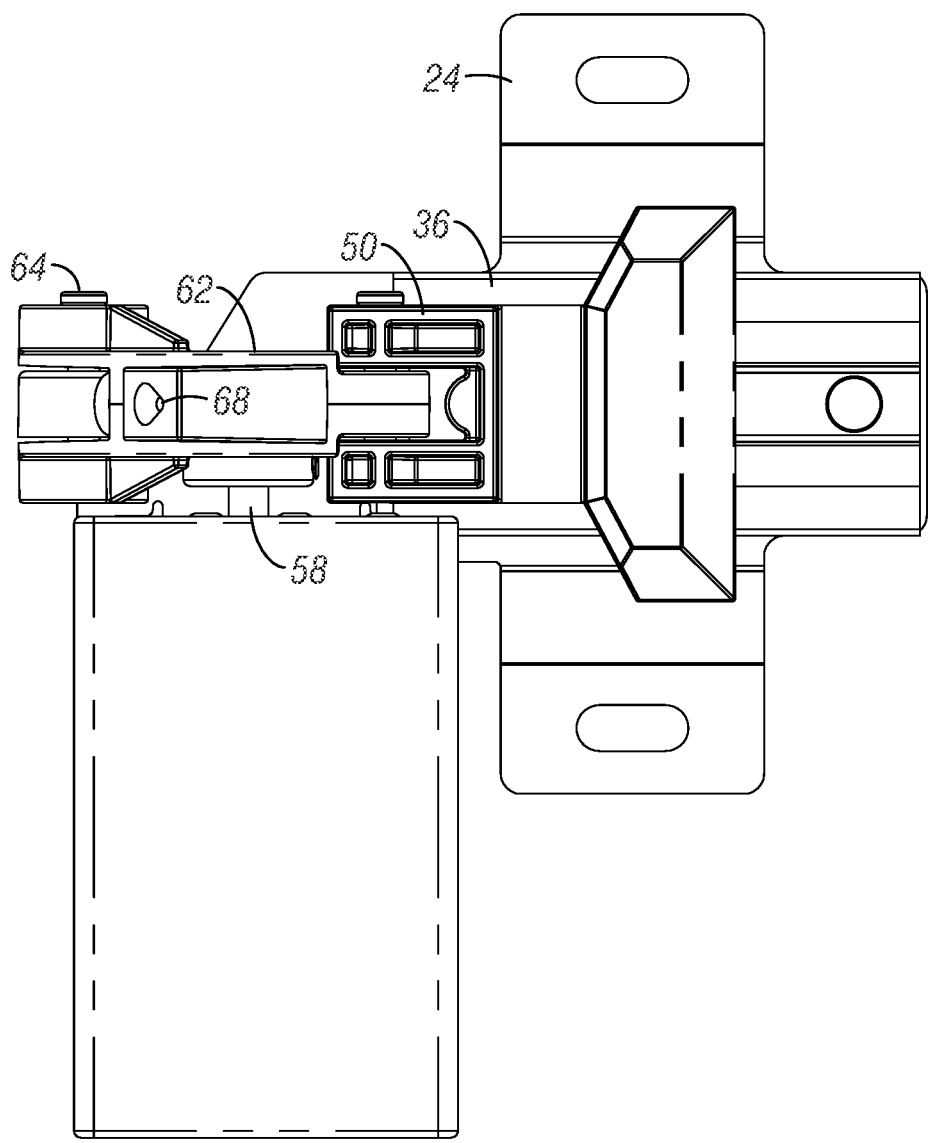
FIG. 14 is a top plan view of the drive mechanism with cover hidden and fully retracted.

The drive mechanism 14 also includes a rail 36 fixed to the mounting plate 24 by rivets 38 or the like extending through aligned holes in the rail 36 and the mounting plate 24. A carriage 40 matingly and slidably mounts to the rail 36. While the sliding connection between the rail 36 and the carriage 40 may take various forms, in one embodiment shown in FIG. 8, the carriage 40 has opposite side edges 42 which are slidably received within C-shaped channels 44 on opposite side edges of the rail 36 for linear tracked movement between extended and retracted positions. The carriage 40 also tracks along the rail 36 via a raised longitudinal rib or protrusion 46 on the rail 36 extending into a longitudinal recess 48 on the bottom of the carriage 40. A strike 50 is fixed to the carriage 40 by screws 52 or similar fasteners.

A cam 54 has a transverse hole 56 for mounting the cam onto the output shaft 58 of the DC motor 26. A setscrew 60 fixes the cam 54 on the output shaft 58. A link 62 has one end pivotally connected to the cam 54 by a pin or bolt 64 extending through aligned holes in the link 62 and the cam 54. The opposite end of the link 62 is pivotally connected to the strike 50 by a pin 66 extending through aligned holes in the link 62 and the strike 50. A bumper 68 having a pointed end is press fit through a hole 70 in the link 62.

Figure 15:
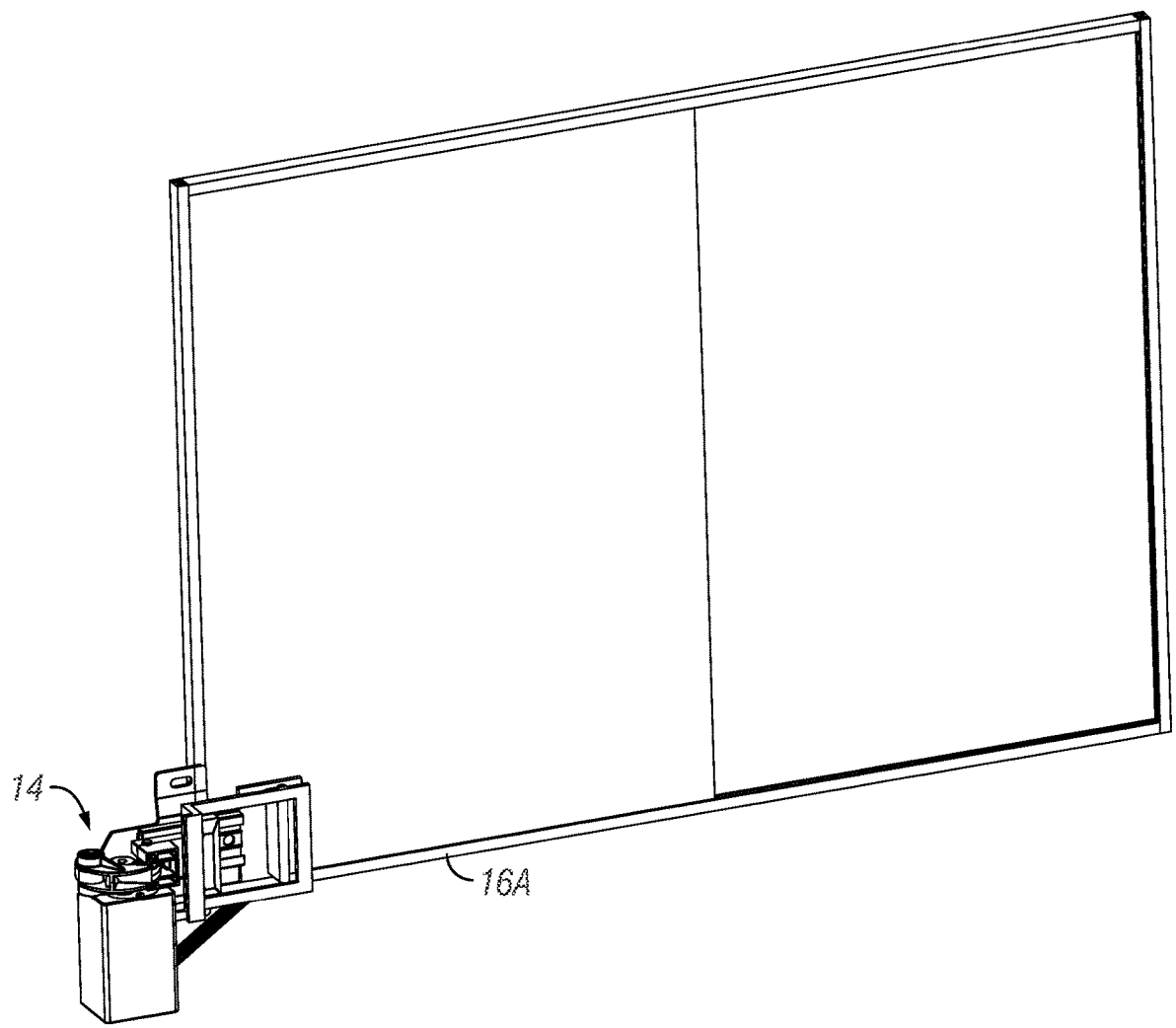
FIG. 15 is a perspective view of the power venting window system mechanism retracted with an alternative embodiment sliding window/door engaged with a latch/ strike on the window and showing the window/door closed.
Figure 16:
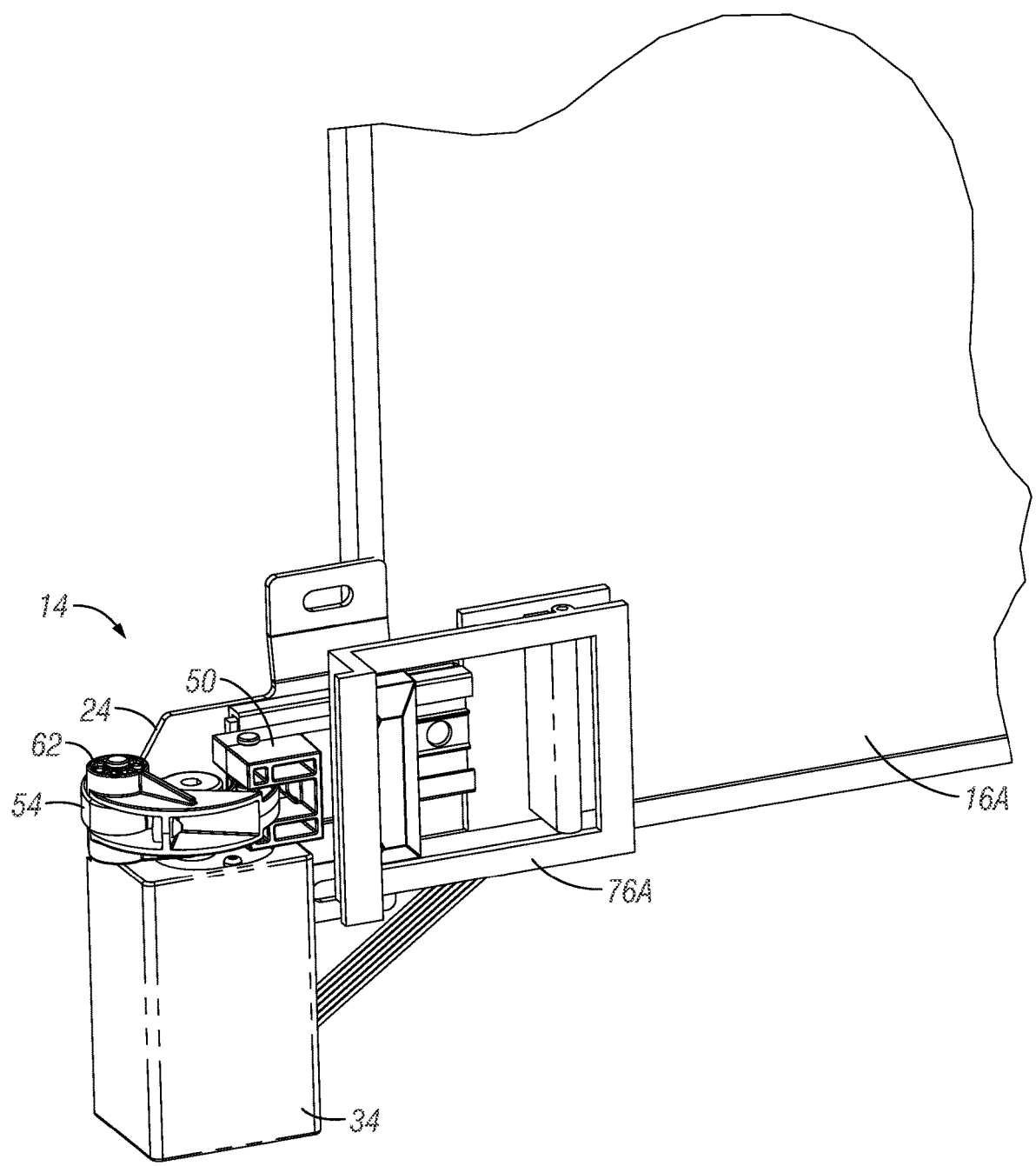
FIG. 16 is a perspective view (close-up) of the power venting window system mechanism from FIG. 15.
Figure 17:
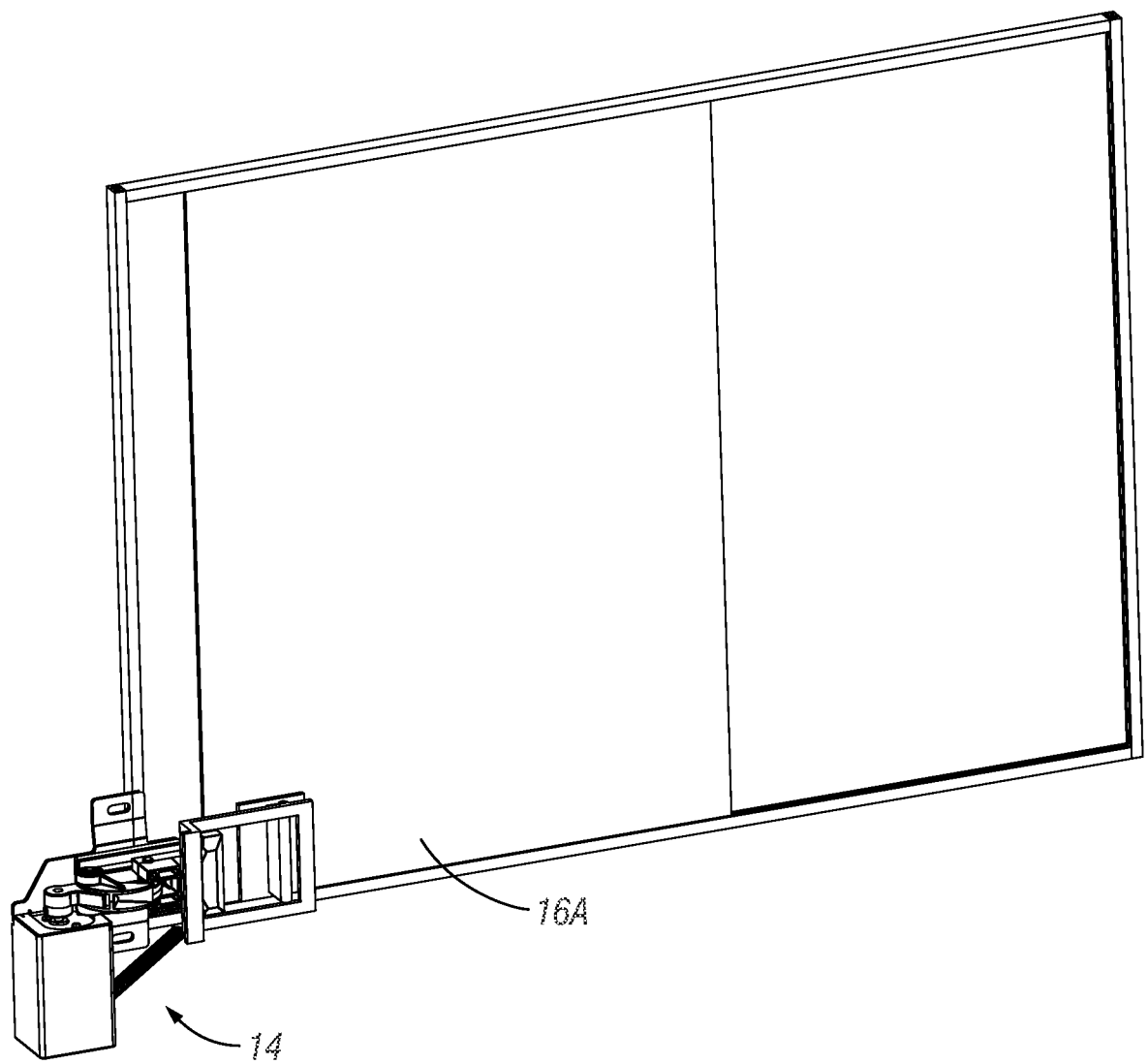
FIG. 17 is a perspective view of the power venting window system mechanism extended with the alternative embodiment sliding window engaged with a latch/strike on the window and showing the window/open.
Figure 18:
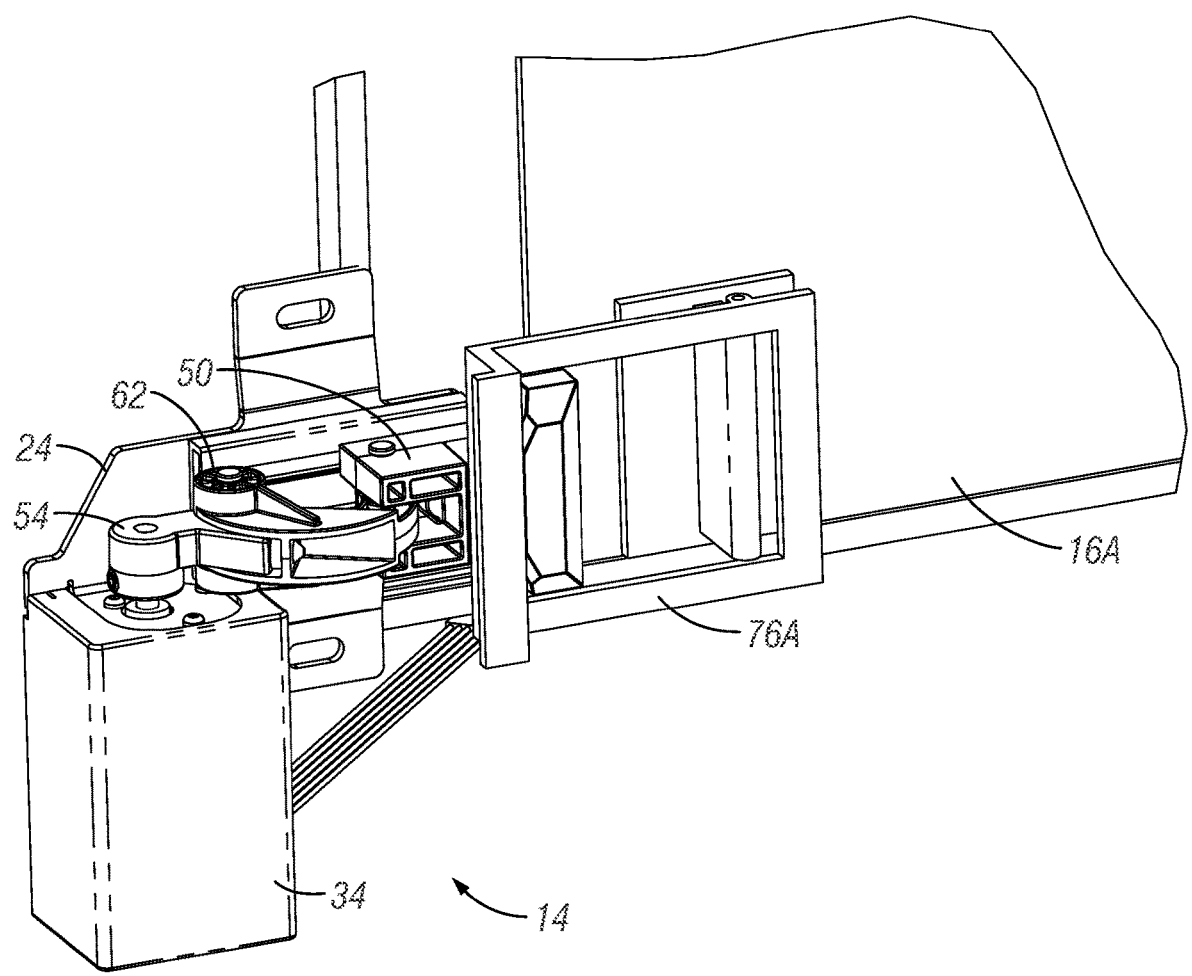
FIG. 18 is a perspective view (close-up) of the power venting window system mechanism from FIG. 17.

The strike 50 includes a strike slot 74 adapted to receive a tab or end of a window handle 76 mounted on the vent window 16. The window handle 76 may take various forms. One preferred form of the window handle 76 is a ¼-turn handle assembly, such as the window handle model 010-7100 or 7120 of Trimark Corporation. When the window handle 76 is engaged in the strike slot 74 in the strike 50, the vent window 16 is locked in the closed position and will not open. The window handle 76 also allows the vent window 16 to be manually opened and closed by the operator in the vehicle cab 10, apart from any control from the latch sensor 22 or the dash switch 72 (described below). Another form of engaging the drive mechanism 14 with an ability to disengage the drive mechanism 14 is shown in FIG. 15, where the rotary latch 78 engages with the striker 86. The rotary latch 78 can be disengaged by standard methods including pulling or twisting of a handle that moves a cable that in turn pulls on the release lever to release the rotary latch 78.

The DC motor 26 preferably has a gear reduction which is low enough such that the drive mechanism 14 cannot be manually back driven from external forces on the vent window 16.

While the drawings show the drive mechanism 14 used on a vent window 16, it is understood that the power venting window system of the present invention can also be used on a sliding window 16A, as shown in FIGS. 15-18. This alternate embodiment also allows for disengaging of the drive mechanism 14 with a simple pivot mechanism 76A connected to the sliding window 16A engageable with the strike slot 74 of the strike 50.

Operation of the Power Venting Window System

The door latch 20 contains the latch sensor 22 that makes a connection to the drive mechanism controller that detects a change of state when the latch opens or closes. The output signal of the latch sensor 22 is connected to the PCB 30 and monitored by software implemented in the microcontroller of the PCB 30. This software determines that the vehicle door 12 is physically closed when the latch sensor signal is active. The software determines that the vehicle door 12 is physically open when the latch sensor signal is electrically open or "floating".

The vehicle door closing event detected by the software will initiate a software control response to close the vent window 16. The software activates the solid-state motor driver integrated circuit on the PCB 30 which controls current flow to the system DC motor 26 for bi-directional control. Position feedback of the system is monitored by software through a hall effect type sensor integrated in the DC motor 26 that generates electrical pulses proportional to the movement of the DC motor 26. Software will enable the motor driver circuit to power the DC motor 26 in the closing direction in response to a detection of the vehicle door closing. The DC motor 26 is driven in the closing direction until a predetermined number of hall effect pulses is received by software, which indicates the vent window 16 is in the fully closed position. At the fully closed position, the software will disable the signal to the motor drive circuit to stop the movement of the DC motor 26.

The software integrated in the microcontroller on the PCB 30 monitors the electrical current supplied to the DC motor 26 and also monitors motor speed determined from the hall effect sensor inside the DC motor 26. During the automatic closing of the vent window 16 an object obstructing the closing will result in an increase in electrical current to the DC motor 26, and a reduction in motor speed. An electrical current that exceeds a predetermined threshold, or a reduction in motor speed below a predetermined threshold as defined in the software causes the motor driver circuit to stop power to the DC motor 26 and return to the full open state.

Those skilled in the art are aware a DC motor's current can vary considerably across extreme temperature ranges. The PCB 30 contains a temperature sensor for measuring ambient air temperatures. The anti-pinch software adjusts the electrical current thresholds based on the temperature provided by the sensor to reduce the occurrence of a false pinch detection.

Those skilled in the art of anti-pinch software are aware that the timing of speed reduction and current rise can vary from system to system, and both can be monitored so that whichever reacts faster will trigger a reversal event.

Software will enable the motor driver circuit to power the DC motor 26 in the opening direction in response to a detection of the vehicle door opening by way of the door latch 20. The DC motor 26 is driven in the open direction until a predetermined number of hall effect pulses is received by software which indicates the vent window 16 is in the fully opened position. At the fully open position, the software will disable the signal to the motor drive circuit to stop the movement of the DC motor 26. The software integrated in the microcontroller on the PCB 30 monitors the electrical current supplied to the DC motor 26 and also monitors motor speed determined from the hall effect sensor inside the DC motor 26. During the automatic opening of the vent window 16, an object obstructing the opening will result in an increase in electrical current to the DC motor 26, and a reduction in motor speed. An electrical current that exceeds a predetermined threshold, or a reduction in motor speed below a predetermined threshold as defined in the software causes the motor driver circuit to stop power to the DC motor 26.

The power venting window system consists of a secondary electrical input from a dash switch 72 that may be located on the operator dashboard of the vehicle. The secondary dash switch 72 is of a momentary type that sends an electrical ground signal to the drive mechanism PCB 30 while the dash switch 72 is pressed by the vehicle operator. The dash switch 72 can have two directions in which the vehicle operator can press the switch. The first direction connects an electrical signal to ground that is detected by the software to indicate an open command from the vehicle operator. The second dash switch direction connects a different signal to ground that is detected by software to indicate a close command from the vehicle operator. In a non-pressed or inactive state, the dash switch 72 will have both signals to the PCB 30 as electrically disconnected or floating.

Software detection of the dash switch 72 pressed in the open direction will result in an electrical signal from the PCB 30 to the DC motor 26 to drive the DC motor 26 in the open direction. When the dash switch 72 is no longer pressed by the vehicle operator, the dash switch returns to a floating state detected by software which will stop the signal driving the DC motor 26. The software will also monitor the hall effect sensor pulses from the DC motor 26 while the DC motor 26 is being driven in response to the dash switch 72 being pressed in the open state. Software will stop the electrical signal driving the DC motor 26 in the event the count of the hall effect pulses reaches a pre-determined threshold.

Software detection of the dash switch 72 pressed in the close direction will result in an electrical signal from the PCB 30 to the DC motor 26 to drive the DC motor 26 in the closed direction. When the dash switch 72 is no longer pressed by the vehicle operator, the dash switch 72 returns to a floating state detected by software which will stop the signal driving the DC motor 26. The software will also monitor the hall effect sensor pulses from the DC motor 26 while the DC motor 26 is being driven in response to the dash switch 72 being pressed in the closed state. Software will stop the electrical signal driving the DC motor 26 in the event the count of the hall effect pulses reaches a pre-determined threshold.

Calibration

The drive mechanism 14 calibration consists of a process that will learn where a mechanical hard stop is located for determining the fully open position. The software then implements a closing operation to characterize the electrical current load produced by the DC motor 26 and the nominal DC motor 26 speed during a closing operation. The software will then implement a second opening operation to characterize the DC motor 26 current and speed during the opening operation.

On initial power up, the software will check the status of calibration motor current and speed values in EEPROM. If calibration values have not been saved in EEPROM, as indicated by values of 0xFFFF, a state machine will be started in software to control the process for calibration of the drive mechanism 14. The Initialize State first confirms that the DC motor 26 is in the stopped position. If the DC motor 26 does not exhibit a stop condition using current monitoring, the software will enter a fault mode after a predetermined timeout period.

If the software determines the DC motor 26 is stopped in the Initializing State, the DC motor 26 will be commanded in software to move toward the fully open state and software will enter the Open Detect state.

The Open Detect state will monitor the motor current and motor speed. If the motor current exceeds a predefined value or motor speed drops below a predefined value, the mechanical hard stop is determined to have been reached and software will stop the DC motor 26. The position of the DC motor 26 is determined in software to be at a zero-reference point where DC motor 26 position is determined by way of a hall effect sensor pulse signal generated by the DC motor 26. If a predetermined timeout occurs without software detecting the mechanical hard stop, the software will enter a fault mode and stop the DC motor 26.

After the software completes the Open Detect state it will start the Close Detect state. Software will command the DC motor 26 to move in the closing direction. During the closing operation, the software will monitor motor current and speed which are to be saved in EEPROM for calibration of the normal DC motor 26 control functions. Software will continue monitoring current and motor speed until a predefined number of hall effect sensor pulses are received to indicate the drive mechanism 14 fully closed position. If during the Close Detect state the motor current exceeds a predefined value or a predefined timeout period occurs prior to obtaining the expected number of motor hall effect sensor pulses, the software will enter the Fault state and stop the DC motor 26.

After the software completes the Close Detect state it will start an Open Detect state. Software will command the DC motor 26 to move in the open direction. During the opening operation, the software will monitor motor current and speed which are to be saved in EEPROM for calibration of the normal DC motor 26 control functions. Software will continue monitoring current and motor speed until a predefined number of motor hall effect sensor pulses are received to indicate the drive mechanism 14 fully open position. If during the Open Detect state the motor current exceeds a predefined value or a predefined timeout period occurs prior to obtaining the expected number of motor hall effect sensor pulses, the software will enter into the Fault state and stop the DC motor 26.

After software completes the final Open Detect state the calibration process is complete and software control is returned to the main software program.

Anti-Pinch Feature

The motorized closing of the drive mechanism 14 potentially presents safety and damage issues if an obstruction is present between the vent window 16 and the window frame 18. Therefore, the drive mechanism 14 includes an anti-pinch feature which stops the vent window 16 from closing and reverses the vent window 16 direction to the fully open position if an obstruction is present. The software will clear a detected pinch event and return to normal operation after an opening event is initiated from the latch sensor 22.

The software will implement a method to detect when an obstruction is present in the normal path of travel of the drive mechanism 14 during a closing event. The detection shall be active during any closing event initiated from the latch sensor 22.

Monitoring the motor current and motor speed are the methods implemented for detecting an anti-pinch event exists. A sensor (not shown) or other detector may be used to monitor the motor current and/or speed. During calibration, the software takes into account current, motor position, motor speed, and temperature of the drive mechanism 14. This calibration is then referenced during DC motor 26 close events. If the motor current at a point of travel exceeds the reference value by a fixed threshold and is less than the motor over current threshold, then a pinch event is determined to be present. Similarly, if the motor speed at any point of travel reduces below the motor speed threshold, then a pinch event is determined to be present. The current threshold is adjusted based on ambient temperature measurement provided by a sensor on the PCB 30 to reduce false pinch detection due to variation of motor current as a result of ambient temperature changes.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed:

1. A power venting window system for a vehicle having a door and at least one window mounted in a window frame, the window being movable between opened and closed positions, the power venting window system comprising:
    a latch adapted to be mounted on the door, and having a sensor to sense open and closed positions of the door latch;
    a drive mechanism with an extendable and retractable arm adapted to be mounted to the window frame and to the window;
    a DC motor to actuate the arm for opening and closing the window; and
    the sensor being adapted to send a first signal to the DC motor in response to sensing the open position of the door latch so as is to extend the arm to open the window and to send a second signal to the motor in response to sensing the closed position of the door latch so as to retract the arm to close the window.

2. The power venting window system of claim 1 wherein the window having a handle which is manually actuatable to disengage from the drive mechanism allowing the window to be manually opened.

3. The power venting window system of claim 1 wherein the window slides back and forth, and wherein the window is manually able to disengage from the drive mechanism allowing manual operation of the window.

4. The power venting window system of claim 1 further comprising a manually activated dash switch operatively connected to the drive mechanism to power open and close the window independent of the door latch position.

5. The power venting window system of claim 1 further comprising a controller for the drive mechanism, the controller being operatively connected to the door latch sensor.

6. The power venting window system of claim 5 wherein the controller is calibrated upon initial power up.

7. The power venting window system of claim 6 wherein the threshold limits can be configured based upon environmental temperature.

8. The power venting window system of claim 5 the controller has motor current and motor speed reverse threshold limits, the threshold limits being calibrated upon initial powering of the controller.

9. The power venting window system of claim 5 wherein the controller actuates the drive mechanism to open the window upon sensing of a pinch event which obstructs closing of the window.

10. The power venting window system of claim 9 wherein the drive mechanism is reset to original parameters after the pinch event by a complete cycle of the door latch sensor.

11. The power venting window system of claim 5 wherein the controller deactuates to stop opening of the window to prevent an event which obstructs opening of the window.

12. A power venting window system for expelling air from a vehicle cab, the vehicle having a door, a door latch, and a window movable between opened and closed positions, the power venting system comprising:
    a drive mechanism connected to the window and to the door latch to automatically open the window when the door latch is open so as to vent air from the cab through the window, and to automatically close the window when the door latch is closed.

13. The power venting window system of claim 12 wherein the drive mechanism is mechanically connected to the window and electronically connected to the door latch.

14. The power venting window system of claim 12 further comprising an electric motor coupled to the drive mechanism to open and close the window.

15. The power venting window system of claim 14 further comprising a door latch sensor to sense an open or closed status of the door latch and send a signal to the motor.

16. The power venting window system of claim 12 further comprising software which monitors speed and electrical current of the motor to sense an obstruction which interferes with movement of the window.

17. The power venting window system of claim 16 wherein the software stops actuation of the drive mechanism for obstructions to window opening and closing.

* * * * *